(12) United States Patent
Takakuwa (10) Patent No.: US 7,871,677 B2
(45) Date of Patent: Jan. 18, 2011

(54) SURFACE TREATING METHOD FOR SUBSTRATE

(75) Inventor: Yuji Takakuwa, 26-21, Nagamachiminami 4-chome, Taihaku-ku, Sendai-shi, Miyagi 980-8577 (JP)

(73) Assignees: Yuji Takakuwa, Sendai-Shi (JP); Tsukishima Kikai Co., Ltd., Tokyo (JP)

( * ) Notice: Subject to any disclaimer, the term of this patent is extended or adjusted under 35 U.S.C. 154(b) by 1319 days.

(21) Appl. No.: 10/520,633

(22) PCT Filed: Jul. 9, 2003

(86) PCT No.: PCT/JP03/08722

§ 371 (c)(1),
(2), (4) Date: Jul. 26, 2005

(87) PCT Pub. No.: WO2004/008510

PCT Pub. Date: Jan. 22, 2004

(65) Prior Publication Data

US 2005/0271831 A1 Dec. 8, 2005

(30) Foreign Application Priority Data

Jul. 10, 2002 (JP) ............................. 2002-201148

(51) Int. Cl.
*H05H 1/24* (2006.01)
(52) U.S. Cl. ........................................ 427/569; 427/595
(58) Field of Classification Search ......... 427/582–584, 427/586, 595, 249.7; 438/708
See application file for complete search history.

(56) References Cited

U.S. PATENT DOCUMENTS 4,588,610 A * 5/1986 Yamazaki ................... 427/583

(Continued)

FOREIGN PATENT DOCUMENTS

JP 61-189631 8/1986

(Continued)

OTHER PUBLICATIONS

Ray et al, Diamond-Like Carbon films prepared by Photochemical Vapour Deposition, Jpn. J. Appl. Phys. vol. 32 (1993), p. L1559-L1561.*

(Continued)

*Primary Examiner*—Timothy H Meeks
*Assistant Examiner*—Elizabeth Burkhart
(74) *Attorney, Agent, or Firm*—Young & Thompson (57) ABSTRACT

A surface treating method for a conductive substrate by using a photo-excitation process, wherein a conducive substrate is placed in a process chamber (1) maintained between 0.001-1 atmospheric pressure, while a negative bias voltage is applied to a substrate (2), ultraviolet having a photo energy of 3-10 eV larger than the work function of the substrate surface is applied from a ultraviolet source (5) housed in a chamber having a light output window, and a process gas is supplied into the process chamber container (1) to thereby produce ions and radicals (6) caused by the collision of process gas molecules with emitted electrons from the substrate surface and allow them to reach the surface of the substrate (2), whereby it is possible to surface-treat a substrate simply, highly efficiently, inexpensively and easily even in the case of a large-area substrate.

22 Claims, 3 Drawing Sheets

U.S. PATENT DOCUMENTS 4,595,601 A * 6/1986 Horioka et al. .............. 438/695
5,183,511 A    2/1993 Yamazaki et al.

FOREIGN PATENT DOCUMENTS

| JP | 02-182883 | * | 7/1990 |
| JP | 04-146620 | * | 5/1992 |
| JP | 8-115891 |   | 5/1996 |
| JP | 9-067674 |   | 3/1997 |
| JP | 2002-075876 | * | 3/2002 |

OTHER PUBLICATIONS

Zhang et al, Low temperature photo-oxidation of silicon using a xenon excimer lamp, Appl. Phys. Lett., vol. 71, No. 20, 1997, p. 2964-2966.*

German Patent Office issued a German Office Action dated Sep. 21, 2005, Application No. 10392913.4.

U.K. Patent Office issued a U.K. Office Action dated May 27, 2005, Application No. 0500273.8.

Diamond deposition technologies, Peter K. Bachmann and Willem van Enckeuort (1992) 1021-1034 Abstract.

* cited by examiner

Fig. 1

Attachment c) Reference Figure 2

Cited Reference A + Cited Reference B [photo-decomposition of material gas]

Present patent [electron impact dissociation of material gas due to electrons emitted from substrate surface]

SURFACE TREATING METHOD FOR SUBSTRATE

TECHNICAL FIELD OF THE INVENTION

The present invention relates to the method of treating the surface of an electrically conductive substrate by using a photo-excitation process to emit electrons from the surface. For the purpose of the present invention, the surface treatment includes the steps of depositing films on the substrate, oxidizing, nitriding or carbonizing the substrate surface, flattening or etching the substrate surface and the like.

BACKGROUND OF THE INVENTION

As surface treating methods using a photo-excitation process, the method of creating radicals by directly resolving the process gas molecule in the gas phase or the method of directly photo-exciting chemically bound molecules and/or atoms on the substrate surface to desorb them from the surface are already generally known. However, since a high photon energy is necessary to realize such phenomena, in fact vacuum ultraviolet of 20 eV or more and soft X ray of 100 eV or more had to be used. For example, a high-power excimer laser usable for the former and an electron storage ring to generate synchrotron radiation usable for the latter are very expensive and also punctual light sources. Therefore, their application for irradiating the substrate surface over a large area is difficult, and they are not put into practical use at the present moment.

And when the process gas comes into contact with the light sources of vacuum ultraviolet or soft X ray, the light sources are damaged. Therefore, it is desirable that the light sources are isolated from the process gas by an optical window. However, since there is no material suitable for an optical window through which light having an energy of 10 eV or more can be transmitted, the pressure of the process gas had to be suppressed to 0.0001 atmospheric pressure or lower, or a differential pumping mechanism or other complicated devices had to be used to achieve a pressure difference between the process chamber and the light source. In the case of the former, the reaction efficiency decreased remarkably, and in the case of the latter, the reaction area under light irradiation was limited down to several mm in diameter constituting a practical problem. And some other photo-excitation processes have been invented wherein ultraviolet of 4.9 eV and 6.7 eV emitted by a low-pressure mercury lamp is used in the place of such light sources. However, due to their extremely low reaction efficiency in the dissociation and ionization of molecules, they have not been put to practical use at the present moment.

The object of the present invention is to provide a method of treating an electrically conductive substrate by using a photo-excitation process wherein even a substrate surface having a large area in particular can be easily treated at a low cost.

DISCLOSURE OF THE INVENTION

According to the present invention, this object can be achieved by placing a conductive substrate in a treating container wherein the pressure is maintained between 0.001-1 atmospheric pressure, by irradiating the surface with ultraviolet having a photon energy of 3-10 eV emitted from a light source housed in a container having a light output window while applying a negative bias voltage to the substrate, and by supplying the treating container with the process gas for the treatment of the substrate surface.

For the purpose of the present invention, the term "conductive substrate" includes not only metallic materials, but also wideband gap semiconductors, that are not conductive in the room temperature but become conductive at high temperatures, such as for example aluminum nitride and also ceramic materials.

In the present invention, ultraviolet having a relatively small energy of 3~10 eV and more preferably 4~9 eV is used. Ultraviolet in this energy region can be generated by general, low-priced light sources such as, for example, a low-pressure mercury [vapor] lamp. This type of light source can emit ultraviolet having a wavelength of 185 nm or 254 nm. However, since the ultraviolet with a wavelength of 185 nm is very likely to generate ozone, in the course of normal use its output is suppressed to the minimum and ultraviolet of 254 nm is preferentially used. For carrying out the present invention, in turn, the ultraviolet of 185 nm not used normally is indispensable, and the low-pressure Hg lamp developed already as the ultraviolet source for removing resist films on semiconductors is commercially available. In addition, this light source is punctual and can take not only a line but also a panel form, and a number of them can be closely arranged to irradiate easily a large area. Other light sources that generate ultraviolet suitable for the conditions of the present invention are included, for example, a deuterium lamp or a xenon (Xe) lamp.

And now the significance of irradiating the surface with ultraviolet of 3~10 eV in the present invention shall be described. When ultraviolet having a low energy of less than 3 eV is used, electrons cannot be emitted from the substrate surface, and no photo-excited process can be instituted. However, if the photon energy is increased greater than the work function of the substrate surface, electrons can be emitted due to the external photoemission effect, and their acceleration by applying a negative bias voltage to the substrate will enable to treat the substrate surface with radicals or ions generated with a high efficiency of reactions between the high-energy electrons and the process gas molecules. Generally, the work function of substances ranges between 3~5 eV, and therefore it is possible to obtain a sufficient number of emitted electrons with irradiation with ultraviolet of 3 eV or more, and in particular effective in case of 4 eV or more. Thus, while the kinetic energy of electrons emitted by the irradiation with ultraviolet of 3 eV or more and in particular 4 eV or more is as small as several eV or less, controlling the negative bias voltage applied to the substrate will enable to increase the kinetic energy of emitted electrons up to the sufficient value to dissolve or ionize the process gas molecule with a high reaction efficiency.

On the other hand, the significance of the upper limit of 10 eV is as follows. As stated above, when the process gas comes into contact with an ultraviolet source, the ultraviolet source is damaged. For isolating completely the ultraviolet source from the process gas, therefore, it is desirable to use a light source housed in a container having a light output window. Since the optical window for the light output absorbs ultraviolet having a wavelength shorter than the energy band gap of the optical window (about 10 eV at the maximum) (in other words, at photon energies larger than 10 eV), no optical window is available in principle. In the conventional process using ultraviolet of larger than 10 eV, therefore, various contrivances have been made to prevent the contact of the process gas with a ultraviolet source including, for example, one to control a pressure balance between the process chamber and the light source with a differential pumping system. In the present invention, as stated below, the conversion of low-energy ultraviolet, the photon energy of which is insufficient to dissolve or ionize the process gas molecule, to high-energy electrons on the substrate surface to which a negative bias voltage is applied is a key concept to make it possible to treat the surface with a very high efficiency, and furthermore the treatment efficiency can be kept high even if part of ultraviolet is absorbed by the light output window. Since the light output window prevents completely from the process gas flowing in reverse to the light source, any type of gas molecules including corrosive gas can be used without any severe problem, and the process gas can be set at arbitrary pressures without taking into account the above-mentioned pressure balance with the light source. Therefore, the present process can include applications in the extended fields. In addition, as ultraviolet of 3~10 eV is hardly absorbed with the process gas molecules, the ultraviolet arriving on the substrate surface is hardly reduced in intensity depending on the gas pressure.

Conclusively, the upper limit of photon energy of ultraviolet available in the present invention depends on the photoabsorption coefficient of the optical window substance, and will be about 10 eV for lithium fluoride (corresponding to a wavelength of 120 nm for the absorption threshold of lithium fluoride). When synthesized quartz glass cheaper than lithium fluoride is employed as a light output window, the upper limit will be approximately 7.8 eV. Therefore, the range of photon energy for ultraviolet ray applicable in the present invention is 3~10 eV, and preferably 4~9 eV.

In order to assure reactions on the substrate surface by using relatively low-energy ultraviolet, in the present invention, the pressure within the process chamber housing the substrate is kept within a range of 0.001~1 atmospheric pressure and preferably within a range of 0.01~0.5 atmospheric pressure. When the process gas in the process chamber is maintained at relatively high pressures as shown above, the electrons emitted from the substrate surface as a result of the absorption of ultraviolet (which are composed of photoelectrons due to direct photo-excitation and secondary electrons due to inelastic scatterings of them in the substrate) collide with the process gas molecules after migrating only a trivial distance of several μm from the surface to produce radicals and ions as a result of electron impact dissociation. The distance where the emitted electrons can migrate until the moment of their collision with the gas molecule becomes shorter as the gas pressure increases. For example, at 0.1 atmospheric pressure, the distance is reduced to 1 μm or less, and collisions will be multiply repeated. From such a viewpoint, the gas pressure of the process chamber will be set at 0.001 atmospheric pressure, or preferably at 0.01 atmospheric pressure or more. On the other hand, if the gas pressure of the process chamber is kept at the atmospheric pressure or more, it will be difficult to maintain the dissociation reactions of electrons emitted from the substrate surface by means of irradiation of ultraviolet 3~10 eV. Therefore, the gas pressure within the process chamber will be limited in maximum to an atmospheric pressure, or preferably to a half atmospheric pressure. As described above, the relatively high pressure of the process gas is of great advantage to that an ultrahigh vacuum specification is not needed for the processing apparatus and that a great deal of heat generated by the ultraviolet lamp is efficiently removed by the process gas to be cooled down.

Incidentally, according to the present invention, the pressure of the process gas in the process chamber is as high as 0.001~1 atmospheric pressure. However, the gas molecules used in many processes excluding oxygen hardly show photoabsorption in the photon energy range of 3~10 eV, and therefore the substrate surface can be irradiated with the ultraviolet without a significant decrease in intensity due to photoabsorption independent of the gas pressure. Accordingly, the emission efficiency of electrons from the substrate surface is not affected at all by the process gas pressure, and furthermore electrons can be emitted with high efficiency near an atmospheric pressure.

And preferable values of the above-mentioned process gas pressure are related with the negative bias voltage applied to the substrate as well as the process control of the surface treatment. In other words, during the surface treatment process, normally the substrate current increases as the gas pressure increases, and then decreases after reaching a maximum value. On the other hand, when the negative bias voltage mentioned above is increased, the substrate current gradually increases, and at a breakdown voltage discharge occurs resulting in a rapid increase of the substrate current. In the present invention, a stably controllable condition without discharge is employed. For this purpose, preferable ranges of bias voltage and gas pressure are determined by prior experiments depending on the subject of processing, and the surface treatment process is controlled at the stable conditions with no discharge where the treating speed is increased as high as possible.

In the present invention, as described above, electrons are emitted from the substrate surface by means of the irradiation of ultraviolet, and the emitted electrons are accelerated by a negative bias voltage to perform the surface treat with higher reaction efficiency. The reaction mechanism of this surface treatment process will be described in details below. Generally, radicals for treating the substrate surface have so far been formed by means of plasma generated by microwave, DC discharge, electronic guns, and the like. Thus an electric power to form radicals is supplied from the outside of the process chamber, so that the radical density is higher far from the substrate surface. This leads to a practical problem of how to transport such radicals to the substrate surface, because most of the radicals formed in this manner are not associated with the surface process such as film deposition. As a result, the reaction efficiency remains low in spite of the high power input, making the whole operation economically expensive and furthermore giving rise to the unintended deposition of films everywhere. On the other hand, according to the present method, electrons emitted from the substrate surface play a role of trigger for the surface treatment process. Therefore generation of radicals and volume of plasmas are limited just on the substrate surface, and furthermore the radicals are generated with a higher density at a closer vicinity of the substrate surface although the extent of plasma is dependent to the gas pressure. Accordingly, waste in the electric power input for the production of radicals is very small, and a great fraction of the radicals produced can contribute to the surface process.

In addition, ultraviolet is irradiated not only on the substrate surface but also on the substrate holder and the inner wall of the process chamber, and even if electrons are emitted, the emitted electrons are not accelerated unless a negative bias voltage is applied thereon. Accordingly, their kinetic energy is maintained very low, so low that no electron impact dissociation reaction can be caused. Thus, since no radicals are formed in the areas not directly related with the surface treatment of the substrate, nothing at all is deposited unnecessarily on the surface of such areas. This not only facilitates the maintenance of process apparatuses but also reduces the possibility that particles fall off the unnecessary deposited films resulting in defects or impurities of films.

The effect to suppress the unintended deposition described above is applicable to the wall of the light output window for ultraviolet lamps. In the previous photo-excitation process such as conventional photo CVD using an ultraviolet lamp or a laser device, unintended deposition on a lamp tube wall or an optical window causes a serious problem. This is because of the dissociation of process gas molecules in the gas phase and complicated contrivances in the design of the optical window and frequent cleaning of the optical window are required. By contrast, in the present method no direct dissociation in the gas phase is caused near the optical window and radicals are produced only in the very close vicinity of the substrate surface. Thus, there is absolutely no deposition on the lamp tube walls and optical windows, which are left maintenance-free.

According to the present method, as described above, the radicals and ions produced in the very close vicinity of the substrate surface can be efficiently transferred to the substrate surface for the surface treatment of the substrate. Moreover, the positive ions produced here are accelerated by the negative bias voltage mentioned above towards the substrate surface and collide with the substrate surface leading to emission of electrons with high efficiency. In addition, in the relaxation process of the positive ions mentioned above, strictly speaking, in the recombination process of the positive ions with electrons to form neutral radicals, secondary generation of ultraviolet occurs.

As a result, even if the output power of the ultraviolet source is low, the collision of the positive ions and the irradiation of the secondary ultraviolet mentioned above are associated with emission of electrons, making it possible to emit electrons from the surface with a large density sufficient for the practical surface treatment process.

And as the present method involves the irradiation of ions of which the kinetic energy is precisely controlled, due to the help of such ions, it is possible to obtain high reaction efficiency even at a low temperature and to improve the adhesion and densification of films. On the other hand, the conventional plasma process contains high-energy ions or neutral particles, so that the substrate surfaces or films are prone to be damaged severely. In particular, in the process of deposition of films in a nanometers scale and the surface treatment in an atomic scale, suppression of such damages has now become a difficult problem. In this respect, the method of the present invention is far advantageous.

In addition, as a conventional ion-assisted process, a method based on cluster ion beams is known. In this method, a cluster consisting of thousands of atoms is ionized to a positive ion and then accelerated to several keV to collide with the surface. Although quite good results are reported, low efficiency in the formation and ionization of the cluster beam, contaminations due to remarkable deposition on the component parts, very sophisticated designs of the process apparatus, difficulty of making the uniformly deposited area large and the like are problems encountered by this method. In this respect also, the method of the present invention is by far advantageous.

And according to the present method, various surface treatments are possible depending on the choice of the process gas. For example, when methane gas is used as a carbon source and mixed with hydrogen, it is possible to deposit a carbon film, in particular a diamond-like film on the substrate surface. This film is useful as a protective coating for a hard disk.

And when a process gas containing a component reactive with the substrate is used, it is possible to form a film derived from the component mentioned above on the substrate. If a gas containing oxygen, nitrogen or carbon is used as the gas mentioned above, an oxide film, a nitride film or a carbonized film on the substrate material is formed. These films can be used to form an alumina film for TMR magnetic head, a gate oxide film for MOSFET, and a passivation film on the titanium metal surface.

A gas containing non-reactive component can be used as a process gas in the present invention. For example, argon gas can be used and the kinetic energy of argon ions upon collision with the substrate can be used for flattening the substrate surface. As an example, it can be used to flatten the surface of the cupper film electrode of a TMR magnetic head.

And in the present method, a mesh electrode facing the substrate is provided within the process chamber. It is connected to the earth potential and a negative bias voltage is applied to the substrate. Through this mesh electrode, the process gas is supplied to the substrate surface and ultraviolet is irradiated on the substrate surface. As described above, the process apparatus of the present invention consists mainly of an ultraviolet source housed within a container having a light output window, a bias power supply and a mesh electrode placed in the opposite direction to the substrate, bringing many outstanding characteristics including not only a simple design of the apparatus construction but also low cost, easy process maintenance, and the possibility of adaptation by improving the existing apparatus. And it is also possible to adapt to a substrate with a large surface area, or a substrate having a morphologically rough surface by increasing the number of ultraviolet sources or by thinking out their arrangement.

DESCRIPTION OF SIGNALS

1. Process chamber
2. Substrate
3. Mesh electrode
4. DC power supply
5. Ultraviolet source
6. Generation of radicals
7. Process gas inlet
8. Exhaust port

THE BEST MODE FOR CARRYING OUT THE PRESENT INVENTION

Figure 1:
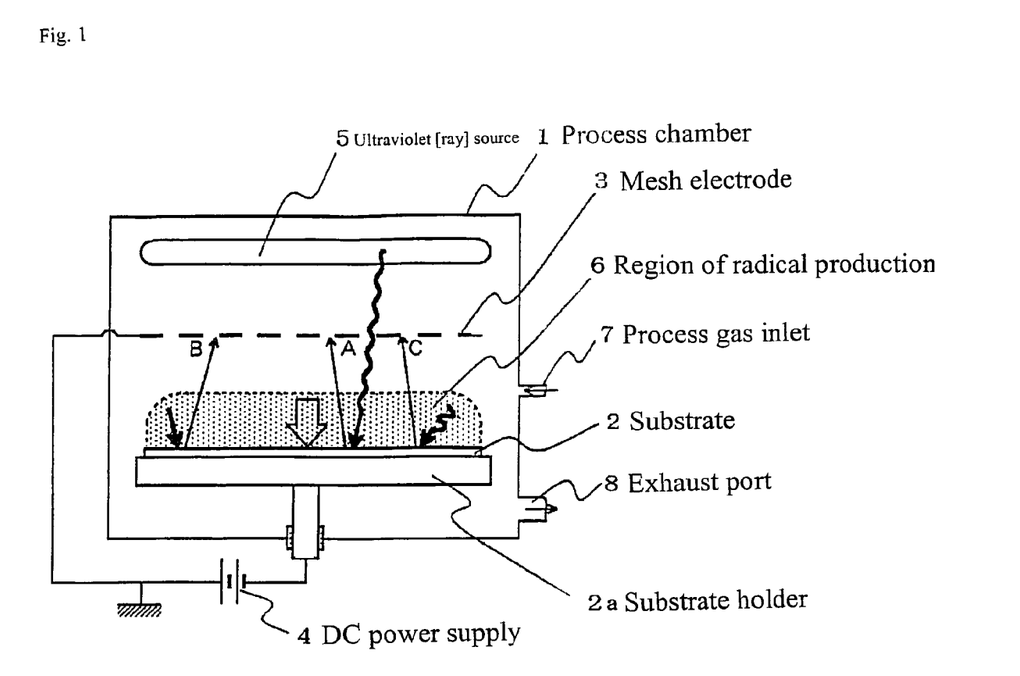
FIG. 1 is a schematic illustration describing the principle of emission of electrons from the substrate surface in the present invention.
Figure 2:
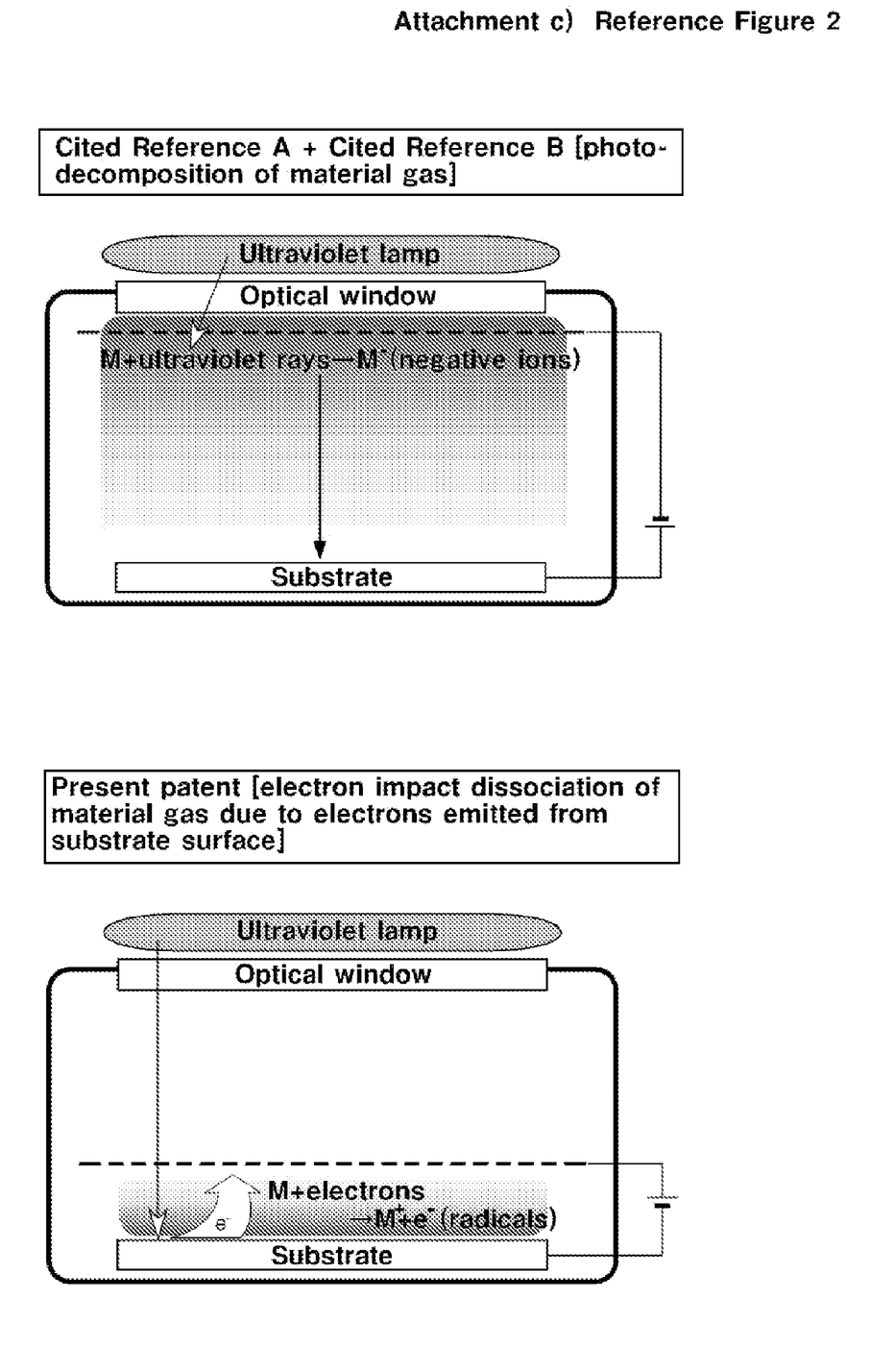

FIG. 1 is a schematic illustration describing an apparatus [device] for carrying out the method of the present invention. In the illustration, 1 represents a process chamber the pressure of which can be reduced to a prescribed pressure through the exhaust port 8 by means of an evacuating pump not shown. And the process gas can be supplied from the process gas inlet 7 through a piping system not shown. 2 represents the substrate, and it is put on a substrate holder 2a being housed in the process chamber and electrically insulated from the process chamber 1. A mesh electrode 3 is positioned facing the substrate 2, and the electrode 3 is also electrically insulated from the process chamber 1. A DC power supply 4 is connected between this electrode 3 and the substrate 2, and the substrate 2 is applied with a negative bias voltage with reference to the mesh electrode 3.

Within the process chamber 1, an ultraviolet source 5, for example a low-pressure [voltage] mercury lamp is placed to irradiate the surface of the substrate 2 with ultraviolet through the mesh electrode 3.

As a result of this irradiation of ultraviolet, electrons are emitted first from the surface of the substrate 2 as shown by A. Electrons are accelerated by the electric field between the substrate 2 and the mesh electrode 3 and are ready to move towards the electrode 3. Because of a high pressure within the process chamber 1, or in other words a high density of gas molecules, electrons collide with gas molecules after moving over a very short distance to form radicals or ion 6. Since radicals or ions are formed in a very close vicinity of the surface of the substrate 2, these can be efficiently transferred to the surface of the substrate 2 for surface treatment of the substrate.

Then, the positive ions formed here are accelerated towards the substrate surface by the bias voltage described above, and collide with the substrate surface, leading to emission of electrons with high efficiency as shown by B. In addition, in the relaxation process of the positive ions mentioned above, secondary generation of ultraviolet causes further emission of electrons as shown by C.

As a result, the emitted electrons continues to multiply rapidly as if it is under a positive feedback until a certain saturation point is reached, and accordingly even if the output of an ultraviolet source serving as a trigger is weak, it is possible to obtain the number of emitted electrons sufficient for the surface treatment process.

And now some embodiments of applying the method of the present invention will be described below.

Embodiment 1

Formation of a Protective Film on the Hard Disk Substrate

A diamond-like film is formed on the substrate of a hard disk. The hard disk consists of, for example, an Al substrate, a Cr underlayer and a CoCrPt alloy ferromagnetic metal layer and the like laminated thereon, and a protective film formed on the ferromagnetic metal layer. The substrate on which the above-mentioned underlayer and ferromagnetic metal layer are formed is placed in the process chamber [treating container], and a −150V bias voltage is applied to the substrate. A mixed gas consisting of hydrogen and methane gas (mixture ratio: methane gas 1% in flow rate) is used as a process gas, and the pressure in the process chamber is maintained at 0.3 atmospheric pressure during the discharge of the process gas. When ultraviolet is irradiated on the substrate surface by using a low-pressure mercury lamp, a diamond-like film was deposited on the surface of the ferromagnetic metal layer.

The growth speed of the film is 0.3 nm~0.5 nm/sec., and a treatment lasting about 10 seconds was enough to produce a film with a sufficient thickness (3 nm) for protecting the hard disk surface. This film contains a diamond-like crystalline structure, and had hardness sufficient to be used as a protective film.

Embodiment 2

Formation of an Oxidized Film for TMR Magnetic Film

An alumina film is formed on a TMR magnetic head. A TMR magnetic head consists of, for example, a Si substrate and the bottom electrode layer (Cu), a magnetic layer, an insulator layer having a tunneling effect, a magnetic layer, a top electrode layer (Cu), and the like successively formed one on the other. An alumina film is used as the electrically insulating layer described above. A substrate consisting of an Al film formed on the bottom electrode layer (Cu) and magnetic layer described above is housed in a process chamber, and while a −50V bias voltage is being applied on the substrate, oxygen diluted by argon or helium (mixture ratio: 5% in flow rate) is supplied as the process gas. The irradiation of ultraviolet on the substrate surface by using a low-pressured mercury lamp while the pressure in the process chamber is maintained at 0.01 atmospheric pressure resulted in the oxidization of the aluminum substrate and the production of an alumina film (thickness: 1.5 nm). This film has a dense structure with a very flat surface morphology, making it possible to improve the detection sensitivity of TMR magnetic heads.

According to the present invention, because of the necessity to apply a bias voltage to the substrate surface of the object, generally the substrate is limited to electrically conductive materials when the temperature of the substrate is room temperature. However, in the case of extremely thin film in a nanometers scale, the present method is applicable to alumina and other insulator film as in the present embodiment. Alumina has a wide band gap of approximately 9 eV, and it is difficult to excite electrons from a valence band to a conduction band by using the ultraviolet now under consideration, and even if such excitation could be realized, it is likely that the emission of electrons results in positively charging up of the substrate. However, as the Fermi level of the magnetic layer is positioned approximately in the middle of the band gap of alumina, irradiation of ultraviolet of 4~5 eV is enough to excite the valence electrons and emit them over the conduction band minimum of the alumina layer to the surface, and therefore there is no problem in principle. However, the difficulty of depositing a metallic film on a sufficiently thick alumina substrate at the room temperature can be overcome by raising the temperature.

Embodiment 3

Formation of the Gate Insulator Film for MOSFET

In order to produce the gate insulator film for MOSFET (metal oxidized semiconductor field-effect transistor), a single crystal silicon wafer is used for the substrate, the same is housed in a process chamber, and oxygen diluted by argon and the like for the process gas (1% in flow rate) is supplied while a −100 V bias voltage is being applied to the substrate. When the substrate surface is irradiated with ultraviolet by means of a low-pressure mercury lamp while the pressure in the process chamber is kept at 0.05 atmospheric pressure, a treatment for two (2) seconds produced a oxidized silicone film of 2 nm. This oxidized silicon (oxide) film has a dense structure, contains no impurity at the same time, and contributes to the improvement of the electrical characteristics of MOSFET.

Embodiment 4

Flattening of the Substrate Surface

The method of the present invention is applied to flatten a cupper film electrode of a TMR magnetic head.

For this purpose, the cupper film electrode of a TMR magnetic head is chosen as a substrate, it is housed in a process chamber, and argon gas is supplied as the process gas while a −200V bias voltage is being applied to the substrate in order to enhance the migration of cupper atoms on the surface by collisions of argon atoms and ions with them. As a result of irradiation of ultraviolet on the substrate surface by using a low-pressure mercury lamp while the pressure in the process chamber is kept at 0.02 atmospheric pressure, the collision of argon ions with the substrate surface resulted in flattening of the same.

In addition, it is possible to produce a nitride film on the substrate surface by using nitrogen in place of oxygen shown in the embodiment 2 above.

INDUSTRIAL APPLICABILITY

In the present invention, a light source housed in a process chamber having a light output window through which ultraviolet having an energy of 3~10 eV can be irradiated is used. The ultraviolet having such energies is available by using, for example, a low-pressure mercury lamp. This lamp is a general-purpose product normally used for removing the resist on semiconductors, and readily available and cheap. In addition, being a line or panel shape, it is suited for irradiating the substrates of large dimensions. And it is possible to apply the present invention to the substrates having large dimensions or morphologically rough surfaces by choosing a larger model of such an ultraviolet lamp, or thinking out its arrangement.

The conventional plasma process had the upper limit and the lower limit of the gas pressure for the generation of plasma. For this reason, any process control carried out in a nanometers scale involved the dilution of the raw material gas with an inert gas such as argon gas. According to the method of the present invention, on the other hand, it is possible to dilute to arbitrary percentages, even if such dilution is necessary, because there is no limit to the pressure of the raw material gas. And with regard to the generation of plasma according to the conventional method, due to the fact that the distribution of radical density is not uniform, plasma is generated over an area substantially wider than that of the substrate surface, and therefore much of the electrical power input is wasted. According to the method of the present invention, however, it is possible to produce radicals over any area adapted to the dimensions of the substrate.

According to the present invention, the pressure within the process chamber is set high at 0.001~1 atmospheric pressure, and preferably at 0.01~0.5 atmospheric pressure. Coupled with the low photon energy of ultraviolet mentioned above, ions or radicals resulting from the collision between the components of the process gas and electrons at a very close vicinity of the substrate surface are generated, and these ions and radicals can be transferred with high efficiency to the substrate surface for surface treatment of the substrate.

In addition, because of a relatively small energy of ultraviolet and a very low kinetic energy of the electrons emitted as a result of the irradiation of ultraviolet with the inner wall of the process chamber and the substrate holder that cause no electron impact dissociation reaction, neither the deposition of heterogeneous matters on the inner wall or the holder mentioned above nor the formation of matters resulting from the reaction occurs. This has the effect of facilitating the maintenance of surface treating apparatuses and preventing generation of various defects or contaminants due to particles peeling off from the unintended deposits.

The invention claimed is:

1. A method for treating a substrate, comprising:
placing an electrically conductive substrate in a treating container maintained at a pressure of 0.1 to 1 atmospheric pressure;
supplying a process gas into the treating container;
irradiating an ultraviolet ray having a photon energy of 3 to 10 eV to a surface of the substrate from a light source housed in the treating container having a light output window so as to emit electrons from the surface of the substrate;
applying a negative bias voltage to the substrate and accelerating the emitted electrons;
producing a dense plasma in a vicinity of the surface of the substrate due to repeated collisions of the accelerated electrons with the process gas under a pressure within the treating container; and
treating the surface of the substrate with the plasma.

2. The method for treating a substrate according to claim 1, wherein the process gas contains raw material components, and a film made from said components is formed on the substrate.

3. The method for treating a substrate according to claim 2, wherein a mesh electrode placed in the opposite direction to the substrate is provided within the process chamber, and a bias voltage negative on the substrate side is applied between said electrode and the substrate.

4. The method for treating a substrate according to claim 2, wherein the pressure within the process chamber is maintained between 0.1-0.5 atmospheric pressure.

5. The method for treating a substrate according to claim 1, wherein the raw material components are carbon and hydrogen and a diamond-like carbon film is formed on the substrate.

6. The method for treating a substrate according to claim 5, wherein a mesh electrode placed in the opposite direction to the substrate is provided within the process chamber, and a bias voltage negative on the substrate side is applied between said electrode and the substrate.

7. The method for treating a substrate according to claim 5, wherein the pressure within the process chamber is maintained between 0.1-0.5 atmospheric pressure.

8. The method for treating a substrate according to claim 1, wherein the process gas contains a component reactive with the substrate material and a film resulting from the reaction between said component and the substrate is formed on the substrate.

9. The method for treating a substrate according to claim 8, wherein the component reactive with the substrate material is any one of oxygen, nitrogen or carbon, and any one of oxide film, nitride film or carbonized film is formed.

10. The method for treating a substrate according to claim 9, wherein a mesh electrode placed in the opposite direction to the substrate is provided within the process chamber, and a bias voltage negative on the substrate side is applied between said electrode and the substrate.

11. The method for treating a substrate according to claim 9, wherein the pressure within the process chamber is maintained between 0.1-0.5 atmospheric pressure.

12. The method for treating a substrate according to claim 8, wherein a mesh electrode placed in the opposite direction to the substrate is provided within the process chamber, and a bias voltage negative on the substrate side is applied between said electrode and the substrate.

13. The method for treating a substrate according to claim 8, wherein the pressure within the process chamber is maintained between 0.1-0.5 atmospheric pressure.

14. The method for treating a substrate according to claim 1, wherein the process gas contains a non-reactive component and the collision of said component results in the flattening of the substrate surface.

15. The method for treating a substrate according to claim 14, wherein a mesh electrode placed in the opposite direction to the substrate is provided within the process chamber, and a bias voltage negative on the substrate side is applied between said electrode and the substrate.

16. The method for treating a substrate according to claim 1, wherein a mesh electrode placed in the opposite direction to the substrate is provided within the process chamber, and a bias voltage negative on the substrate side is applied between said electrode and the substrate.

17. The method for treating a substrate according to claim 16, wherein the pressure within the process chamber is maintained between 0.1-0.5 atmospheric pressure.

18. The method for treating a substrate according to claim 1, wherein the pressure within the process chamber is maintained between 0.1-0.5 atmospheric pressure.

19. The method for treating a substrate according to claim 1, wherein ultraviolet having a photon energy of 4~9 eV is irradiated.

20. The method for treating a substrate according to claim 1, wherein a discharge-type lamp such as low-pressure mercury lamp is used as a light source of ultraviolet.

21. A method for treating a substrate, comprising:
   placing an electrically conductive substrate in a treating container maintained at a pressure of 0.1 to 1 atmospheric pressure;
   supplying a process gas into the treating container;
   irradiating an ultraviolet ray having a photon energy of 3 to 10 eV to a surface of the substrate from a light source housed in the treating container having a light output window;
   applying a negative bias voltage to the substrate with respect to an electrode, the electrode having a plurality of openings through which an ultraviolet ray is allowed to pass and arranged between the light source and the substrate in a manner facing the substrate;
   whereby a dense plasma is produced in a region close to the surface of the substrate and between the substrate and the electrode under a pressure within the treating container; and
   treating the surface of the substrate with the plasma.

22. A method for treating a substrate, comprising:
   placing an electrically conductive substrate in a treating container maintained at a pressure of 0.1 to 1 atmospheric pressure;
   supplying a process gas into the treating container;
   irradiating an ultraviolet ray having a photon energy of 3 to 10 eV to a surface of the substrate from a light source housed in the treating container having a light output window so as to emit electrons from the surface of the substrate;
   applying a negative bias voltage to the substrate with respect to an electrode, the electrode having a plurality of openings through which an ultraviolet ray is allowed to pass and arranged between the light source and the substrate in a manner facing the substrate, and accelerating the emitted electrons;
   producing a dense plasma in a region close to the surface of the substrate and between the substrate and the electrode due to repeated collisions of the accelerated electrons with the process gas under a pressure within the treating container; and
   treating the surface of the substrate with the plasma.

* * * * *